United States Patent Office 2,943,104
Patented June 28, 1960

2,943,104

TREATMENT OF HYDROCARBON SOLUTIONS OF OXYGENATED CHEMICALS

Neal M. Caruthers, Tulsa, Okla., assignor to Pan American Petroleum Corporation, Tulsa, Okla., a corporation of Delaware No Drawing. Filed May 8, 1957, Ser. No. 657,738

5 Claims. (Cl. 260—449.6)

The present invention relates to a novel process for improving the quality of hydrocarbons recoverable from hydrocarbon-oxygenated chemical mixtures. More particularly, it is concerned with the recovery of terminal or 1-olefins in maximum quantities from solutions thereof containing oxygenated organic chemicals.

The hydrocarbon phase produced by the reduction of carbon monoxide with hydrogen in the presence of a fluidized catalyst, particularly an iron catalyst, is made up primarily of terminal olefins, i.e. at least about 75 percent of the hydrocarbons in said phase are terminal olefins. In order to make high quality motor fuels from this hydrocarbon phase, however, the dissolved oxygenated compounds must either be removed or converted into olefins by deoxygenation and the entire olefin component must be isomerized by shifting the double bond toward the center of the carbon chain. This object has been accomplished by contacting the aforesaid hydrocarbon phase with a suitable catalyst, such as alumina at about 370° to 480° C. The catalyst was periodically regenerated by burning off any carbonaceous or other objectionable residues at temperatures of about 600° C. and at pressures of the order of 100 p.s.i.

While such a procedure gives high quality motor and diesel fuels, the olefins, the bulk of which are nonterminal in structure, i.e. internal olefins, do not serve as a good raw material for chemical synthesis since the types of chemicals derivable from terminal olefins are much more useful than those produced from their nonterminal isomers. Thus, if it is desired to recover a substantially pure stream of terminal olefins from a hydrocarbon synthesis oil phase, it has generally been desirable to recover at least a portion of the chemicals in said phase prior to the subsequent treatment of the latter to obtain the desired terminal olefins. The oil fraction produced in the now generally known modification of the Fischer-Tropsch synthesis has a significant content of chemicals, such as acids, ketones, aldehydes and alcohols, together with a relatively small proportion of esters. For example, in a hydrocarbon synthesis plant designed to produce 6,000 barrels per day of liquid hydrocarbons, there are produced about 320,000 pounds per day of oil-soluble chemicals. The distribution of these chemicals in the oil stream breaks down as follows: 100,000 pounds of carbonyl compounds, 100,000 pounds of alcohols, 90,000 pounds of acids and 30,000 pounds of esters. Owing to their value as chemicals, it is desirable to separate these oxygenated componds as completely as possible from the oil stream. Also, in the subsequent utilization of the olefinic hydrocarbons for chemical syntheses, it is imperative that these oxygenates be removed from the oil to avoid catalyst poisoning or contamination of the products.

In recovering oil-soluble chemicals from hydrocarbon solutions thereof, such as for example, hydrocarbon solutions of the type produced by the reaction of carbon monoxide with hydrogen at elevated temperatures and pressures in the presence of a fluidized alkali-promoted iron catalyst, it has been proposed that aqueous soap solutions of various types be employed as selective solvents or extractants for such chemicals. Generally, these "soap" solutions are not composed of soaps in the ordinary sense, but are made up largely of substantially non-surface-active salts of alkali metals or equivalent salts derived from carboxylic acid mixtures having an average molecular weight ranging from about 115 to about 155. Soap solutions of this type are most conveniently prepared by adding the required amount of an aqueous solution of caustic, or other suitable base, to the primary oil fraction produced in hydrocarbon synthesis whereby the free acids present in said fraction are neutralized. A substantial proportion of the oil-soluble chemicals, containing about 5 to 10 weight percent of hydrocarbons, is solubilized in the soap solution.

Accordingly, it is an object of my invention to provide a method for converting the oxygenated chemicals found in the aforesaid hydrocarbon phase to terminal olefins without simultaneously isomerizing the terminal olefins originally present in said phase. It is another object of my invention to provide conditions for securing conversion of said chemicals into terminal olefins without subsequent alteration and under conditions favoring a long and active catalyst life. It is a further object of my invention to provide a means for treating hydrocarbon solutions of the above mentioned variety whereby a substantially chemical free hydrocarbon solution is obtained having a maximum terminal olefin content, such object being accomplished without the use of expensive soap extraction or similar methods.

In carrying out the process of my invention I subject a terminal olefin-containing hydrocarbon solution of oxygenated chemicals to a deoxygenation step in the presence of an activated alumina, specifically, α-alumina monohydrate. The conditions used in effecting deoxygenation of the chemicals present in the hydrocarbon solution are essentially equivalent to those previously used. However, the process of my invention differs from prior deoxygenation techniques in that I regenerate the catalyst under conditions unlike those formerly employed. The basis for this novel method of regenerating and conditioning the catalyst resulted from observations I made during the early stages of my work on this problem. Thus, I found that with α-alumina monohydrate good removal of chemicals, i.e., deoxygenation, from their hydrocarbon solutions with very little, if any, shifting of the olefinic bond occurred during the first use cycle of the catalyst. However, when I regenerated the catalyst by burning off the carbonaceous deposits thereon with temperatures in the range of 600° C. and resumed treatment of said hydrocarbon solutions, deoxygenation was still excellent but was accompanied by extensive shifting of the terminal olefinic bond toward the center of the carbon chain. Shifting of the double bond seemed to discontinue, however, after an initial period. Simultaneously with this result during such period I noted that the usual amount of water given off during deoxygenation failed to appear. I then undertook a study of the effect of water content of the catalyst on this double bond shift. This investigation showed that if the regenerated catalyst was saturated with water at about 300° to about 350° C. the double bond shifting would not occur. If no such treatment was made, i.e. the catalyst was left in its dehydrated condition, after the high temperature regeneration step, the double bond shift occurred until the catalyst absorbed sufficient water to become saturated.

In practicing my invention catalyst which has become substantially inactive in the deoxygenation reaction is first subjected to a regeneration step involving burning off the deposited carbon at a temperature of about 600° C. Thereafter, the catalyst is contacted with steam at a temperature in the range at which deoxygenation is carried out, i.e. from about 300° to about 350° C. until the catalyst is saturated with water. Treating temperatures up to about 400° C. may be used if steam is added to the oil vapor passing over the catalyst; however, such large quantities of steam are required at this level that it is not ordinarily desirable to operate at temperatures much above 350° C. After the catalyst has been saturated with steam under the aforesaid conditions, it is ready for further contacting by the hydrocarbon solution to deoxygenate the chemicals present therein. The deoxygenation step is continued until the presence of oxygenated chemicals is again detected in the product. The regeneration and steam treatment steps are then carried out and the above cycle repeated.

Experiments have been undertaken to determine the ability of materials other than α-alumina monohydrate to deoxygenate such hydrocarbon solutions without shifting the double bond in the terminal olefins present. Examples of such materials are different forms of γ-alumina, Cyclocel, which is bauxite (aluminum oxide) with not more than about 10 percent silica, etc. However, I have found that none of these materials is capable, even with steam treatment after regeneration, of deoxygenating the chemicals in the aforesaid hydrocarbon solutions without causing substantial shifting of the olefinic bond.

The process of my invention will be better understood by reference to the following examples.

EXAMPLE I

Neutral oil, prepared by neutralizing primary oil from hydrocarbon synthesis with an aqueous 20 percent caustic solution, was used in this run. Sixty-two grams (67 ml.) of Alcoa F-1 alumina, the X-ray diffraction pattern of which indicates that it is α-alumina monohydrate, was charged to a Pyrex glass tubular reactor 10 inches long and ¾ inch in diameter. The reactor containing the catalyst was then immersed in a molten metal bath maintained at a temperature of about 305° C. The catalyst had an average particle size of from 8 to 14 mesh and analyzed as follows:

|  | Percent |
|---|---|
| $Al_2O_3$ | 92 |
| $Na_2O$ | 0.8 |
| $Fe_2O_3$ | 0.12 |
| $SiO_2$ | 0.09 |
| Loss on ignition | 6.8 |

The hydrocarbon solution to be deoxygenated was flashed to an overhead end-point of 171° C. at 86 mm. absolute pressure, corresponding to about 250° C. at atmospheric pressure. The distillate recovery was 78.9 weight percent of the charge and analyzed as follows:

| | |
|---|---|
| Specific gravity 20/4 | 0.752 |
| Alcohol, meq./g. | 0.86 |
| Carbonyl, meq./g. | 0.59 |
| Ester, meq./g. | 0.13 |
| Acid, meq./g. | 0.03 |
| Weight percent hydrocarbons | 75.4 |

Space velocities of from 0.75 to .95 gram of the flashed oil feed per hour per ml. of catalyst bulk volume were employed.

In this particular experiment two different sets of conditions were used. The first run was made to demonstrate the beneficial effect obtained by saturating the catalyst, after regeneration, with water at reaction temperature. Run 2 compares the effect of a dry unsteamed catalyst on terminal olefin content in the product. In Run 1 the catalyst shown in the table below was subjected to four complete cycles, a cycle constituting a use and a regeneration period. In Run 2 the catalyst was used for two complete cycles.

*Table 1*

|  | Run 1 Aggregate Samples from 4 Cycles | | | Run 2 Aggregate Samples from 2 Cycles | | |
|---|---|---|---|---|---|---|
| Test Period | 1 | 2 | 3 | 1 | 2 | 3 |
| Total Flows, grams: | | | | | | |
| Feed | 57.0 | 60.3 | 58.5 | 27.9 | 28.9 | 29.6 |
| Products— | | | | | | |
| Hydrocarbon phase | 53.2 | 57.0 | 56.1 | 24.7 | 26.3 | 25.2 |
| Water phase | 1.5 | 2.2 | 2.2 | 0.0 | 0.05 | 0.6 |
| Tail gas | 0.1 | 0.1 | 0.1 | 0.1 | 0.0 | 0.0 |
| Loss, by difference | 2.2 | 1.0 | 0.1 | 3.1 | 2.55 | 3.8 |
|  | 57.0 | 60.3 | 58.5 | 27.9 | 28.9 | 29.6 |
| Recovery, Wt. Percent of Feed: | | | | | | |
| Hydrocarbons | 93.3 | 94.5 | 95.9 | 88.6 | 91.0 | 85.2 |
| Water | 2.6 | 3.6 | 3.8 | 0.0 | 0.2 | 2.0 |
| Tail gas | 0.2 | 0.2 | 0.2 | 0.3 | 0.0 | 0.0 |
| Loss | 3.9 | 1.7 | 0.1 | 11.1 | 8.8 | 12.8 |
|  | 100.0 | 100.0 | 100.0 | 100.0 | 100.0 | 100.0 |
| Hydrocarbon Product Analyses: | | | | | | |
| Alcohol removal, Mol Percent | 100 | 100 | 96 | 100 | 100 | 100 |
| Carbonyl removal, Mol Percent | 91 | 99 | 93 | 100 | 100 | 100 |
| Terminal olefin concentration, $R_p{}^1$ | 89 | 83 | 84 | 55 | 87 | 95 |
| Terminal Olefin Recovery:[1] | | | | | | |
| Percent of Feed | 110 | 104 | 107 | 65 | 105 | 107 |

[1] Terminal olefin recovery, as weight percent of terminal olefins in feed equals $$100 \times \frac{N \times R_p \times Y}{N \times R \times H} \text{ or } \frac{R_p Y}{RH}$$

Where:
$N$ = wt. percent terminal olefin in feed.
$R = 100$: relative concentration of terminal olefin in oxy-free feed; as determined by infrared spectrophotometer absorption peaks at the wave length of about 2.9 microns on a sample that has been rendered oxy-free by a silica-gel percolation.
$R_p$ = relative concentration of terminal olefin in oxy-free product; as determined by infrared spectrophotometer.
$Y$ = Yield: pounds of hydrocarbon product per 100 pounds of feed.
$H$ = wt. percent hydrocarbons in feed = 75.4.

From the above example it may be seen that although the dry unsaturated catalyst in Run 2 eventually recovered its efficiency to deoxygenate chemicals without causing a shift in olefinic bonds, a substantial decrease in terminal olefinic content of the product was observed during the first test period. In a commercial scale operation this effect would obviously represent a substantial loss of recoverable terminal olefins.

EXAMPLE II

Under conditions similar to those used in Example I a number of other materials were tested to determine their catalytic ability to deoxygenate without causing a loss in olefin content. In each case the catalyst was treated with steam after regeneration in accordance with my invention. The conditions used and the results obtained are shown in the table below:

α-alumina monohydrate, e.g., 200 mesh, feed in vapor form is introduced at a space velocity ranging from 0.6 to 1.3 grams of feed per ml. of catalyst per hour. Catalyst is continuously bled off from the reaction zone to a regenerating unit and after regeneration treated with steam as described above and then returned to the vessel in which deoxygenation is occurring.

I claim:

1. In a continuous process for the deoxygenation of oxygenated chemicals dissolved in a hydrocarbon solution comprising at least one liquid terminal olefin, the improvement which comprises contacting the solution of said chemicals and hydrocarbons in a reaction zone with substantially pure α-alumina monohydrate at a temperature ranging from about 300° to about 350° C. until the presence of said chemicals is detected in the effluent from said zone, thereafter discontinuing flow of said chemicals

*Table II*

CATALYTIC VAPOR PHASE DEOXYGENATION OF NEUTRAL SYNTHESIS OIL FRACTIONS OPERATING DATA AND INFRARED SPECTROPHOTOMETER DATA

| Run No. | Catalyst | | | Test Period | Flow Rates | | Conversions | | |
|---|---|---|---|---|---|---|---|---|---|
| | Kind | Vol., ml. | Temp., °C. | | Feed, g. | Space Velocity, g./Hr./ml. of catalyst | Alcohol, Mol Percent Decrease | Carbonyl, Mol Percent Decrease | Terminal Olefin, Relative Conc., Mol Percent |
| 1 | Cyclocel SB-6-56-B | 40 | 305 | 1 | | | 100 | 84 | 16 |
| | | | | 2 | | | 100 | 70 | 22 |
| | | | | 3 | 43.4 | 1.1 | 100 | 77 | 52 |
| | | | | 4 | | | 98 | 40 | 70 |
| 2 | Alcoa H-151* | 66 | 305 | 1 | | | 99 | 96 | 11 |
| | | | | 2 | 46.8 | .72 | 100 | 96 | 11 |
| | | | | 3 | | | 94 | 93 | 12 |
| | | | | 4 | | | 100 | 91 | 14 |
| 3 | Alcoa F-10* | 60 | 305 | 1 | 15.5 | 1.03 | 100 | 100 | 24 |
| | | | | 2 | 15.9 | 1.06 | 100 | 95 | 34 |
| | | | | 3 | 16.1 | 1.07 | 100 | 80 | 51 |
| | | | | 4 | 15.8 | 1.05 | 100 | 64 | 72 |
| 4 | Alcoa F-6* | 58 | 305 | 1 | 15.1 | 1.04 | 100 | 100 | 4 |
| | | | | 2 | 15.6 | 1.08 | 100 | 91 | 11 |
| | | | | 3 | 16.4 | 1.13 | 100 | 84 | 7 |
| | | | | 4 | 15.3 | 1.06 | 100 | 71 | 21 |

*These catalysts, which are all indicated by X-ray diffraction to be anhydrous γ-alumina, have the following analyses:

| | F-6 | F-10 | H-151 |
|---|---|---|---|
| $Al_2O_3$ | 88. | 96. | 85. |
| $Na_2O$ | 0.76 | 0.10 | 2.0 |
| $Fe_2O_3$ | 0.11 | 0.05 | 0.15 |
| $SiO_2$ | 0.08 | 0.10 | 6.3 |
| Loss on ignition to 1,100° C | 8.5 | 3.0 | 6.2 |
| $CoCl_2$ | 2.0 | | |
| Surface area, sq. meters/g | 200 | | 350 |

It will be appreciated from the foregoing description that the process of my invention is applicable for treatment of a wide variety of hydrocarbon solutions of oxygenated chemicals in which it is desired to effect such deoxygenation without bringing about a shifting of the point of unsaturation in the olefins present. While the process described above may be used instead of the soap extraction method previously referred to for removing chemicals from hydrocarbon solutions, it also may be used to remove the last traces of chemicals in the hydrocarbon raffinate stream obtained from soap extraction, where it is desired both to secure maximum chemicals recovery and a hydrocarbon stream having a high concentration of terminal olefins. Acid-containing feeds, such as hydrocarbon synthesis primary oil likewise may be used; however, it has been my observation that the catalyst life, under such circumstances, is rather short, possibly due to the formation of salts which tend to plug the catalyst pores. It will further be appreciated that in adapting my invention to continuous methods, a multiple bed system may be employed in which one or more fixed beds are being regenerated and conditioned while others are being used in the production portion of the cycle. Also, fluid bed operation is contemplated within the scope of this invention. Thus, with a fluid bed of finely divided and hydrocarbons through said zone, subjecting said alumina to a temperature above about 600° C. in the presence of an oxidizing gas whereby deposited carbon is burned off of said alumina, next contacting the latter with steam at a temperature of from 300° to about 350° C. until said alumina is saturated therewith, and thereafter repeating the above cycle.

2. In a continuous process for the deoxygenation of nonacid oxygenated organic chemicals dissolved in a liquid terminal olefin, the improvement which comprises contacting the solution of said chemicals and olefins in a reaction zone with a bed of substantially pure granular α-alumina monohydrate at a temperature ranging from about 300° to about 350° C. until the presence of said chemicals is detected in the effluent from said zone, thereafter discontinuing flow of said chemicals and hydrocarbons through said zone, subjecting said alumina to a temperature above about 600° C. in the presence of an oxidizing gas whereby deposited carbon is burned off of said alumina, next contacting the latter with steam at a temperature of from 300° to about 350° C. until said alumina is saturated therewith, and thereafter repeating the above cycle.

3. In a continuous process for the deoxygenation of oxygenated organic chemicals dissolved in a hydrocarbon solution comprising at least one liquid terminal olefin, said solution having been produced by the reaction of carbon monoxide with hydrogen in the presence of an iron catalyst, the improvement which comprises contacting said solution in a reaction zone with substantially pure α-alumina monohydrate at a temperature ranging from about 300° to about 350° C. until the presence of said chemicals is detected in the effluent from said zone, thereafter discontinuing flow of said solution through said zone, subjecting said alumina to a temperature above about 600° C. in the presence of an oxidizing gas whereby deposited carbon is burned off of said alumina, next contacting the latter with steam at a temperature of from 300° to about 350° C. until said alumina is saturated therewith, and thereafter repeating the above cycle.

4. In a process for recovering a stream of substantially chemical free hydrocarbons containing at least one liquid terminal olefin from a mixture of nonacid oxygenated organic chemicals dissolved therein by subjecting the mixture of hydrocarbons and chemicals to extraction with an aqueous solution of a relatively nonsurface-active fatty acid salt, said salt being derived from a preferentially oil-soluble carboxylic acid, to obtain a hydrocarbon raffinate containing said at least one olefin and a decreased concentration of said chemicals, the improvement which comprises contacting said raffinate in a reaction zone with substantially pure α-alumina monohydrate at a temperature ranging from about 300° to about 350° C. until the presence of said chemicals is detected from the effluent in said zone, thereafter discontinuing the flow of said hydrocarbons and chemicals through said zone, subjecting said alumina to a temperature above about 600° C. in the presence of an oxidizing gas whereby deposited carbon is burned off of said alumina, next contacting the latter with steam at a temperature of from 300° to about 350° C. until said alumina is saturated therewith, and thereafter repeating the above cycle.

5. In a process for recovering a stream of substantially chemical free hydrocarbons comprising at least one liquid terminal olefin from the nonacidic oil phase obtained by neutralizing the hydrocarbon layer produced by the reaction of carbon monoxide with hydrogen in the presence of an iron catalyst, the improvement which comprises contacting a mass of substantially pure α-alumina monohydrate with said phase in a reaction zone at a temperature ranging from about 300° to about 350° C. until the presence of said chemicals is detected in the effluent of said zone, thereafter discontinuing flow of said phase through said zone, subjecting said alumina to a temperature above about 600° C. in the presence of an oxidizing gas whereby deposited carbon is burned off of said alumina, next contacting the latter with steam at a temperature of from 300° to about 350° C. until said alumina is saturated therewith, and thereafter repeating the above cycle.

References Cited in the file of this patent
UNITED STATES PATENTS

| | | |
|---|---|---|
| 2,754,314 | McGrath | July 10, 1956 |
| 2,816,906 | Gilbert et al. | Dec. 17, 1957 |

OTHER REFERENCES

"Thermal Transformation of Aluminas and Alumina Hydrates," Stumpf et al., Ind. and Eng. Chem., vol. 42, 1950, pages 1398–1403.